Nov. 1, 1955  E. S. L. BEALE  2,722,604

ELECTRONIC INTEGRATING CIRCUIT

Filed Feb. 8, 1952

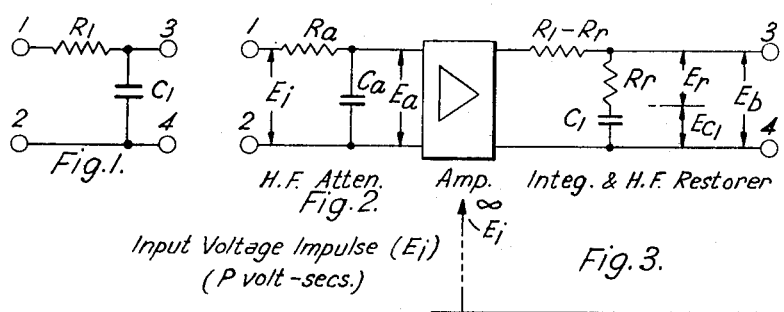

Fig.1.

H.F. Atten. Amp. Integ. & H.F. Restorer
Fig. 2.

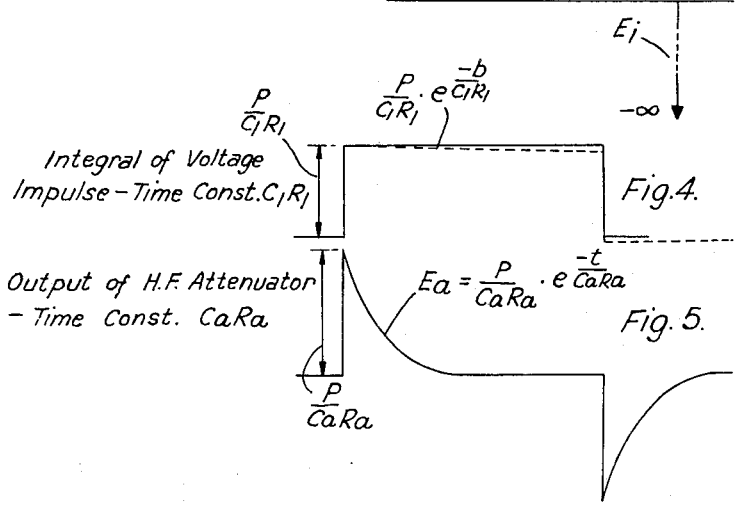

Input Voltage Impulse ($E_i$)
(P volt-secs.)

Fig. 3.

Integral of Voltage
Impulse – Time Const. $C_1R_1$

Fig. 4.

Output of H.F. Attenuator
– Time Const. $C_aR_a$ $$E_a = \frac{P}{C_aR_a} \cdot e^{\frac{-t}{C_aR_a}}$$

Fig. 5.

Voltage $E_{c_1}$ across Integ. Cap.$^r$ $C_1$ with H.F. Atten.$^r$ in circuit $$E_{c_1} = \frac{P}{C_1R_1} \cdot (1-e^{\frac{-t}{C_aR_a}})$$

Fig. 6.

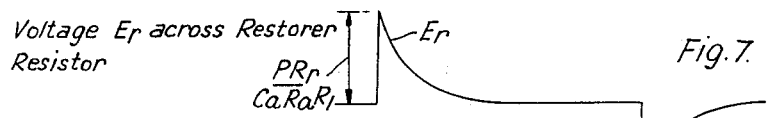

Voltage $E_r$ across Restorer Resistor $\frac{PR_r}{C_aR_aR_1}$

Fig. 7.

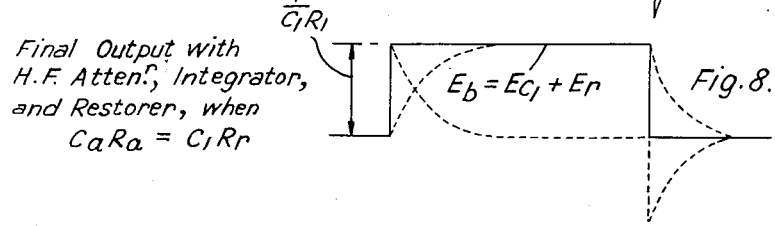

Final Output with H.F. Atten.$^r$, Integrator, and Restorer, when $C_aR_a = C_1R_r$ $E_b = E_{c_1} + E_r$

Fig. 8.

Inventor
E. S. L. BEALE
By
Attorney

United States Patent Office 2,722,604
Patented Nov. 1, 1955

2,722,604

ELECTRONIC INTEGRATING CIRCUIT

Evelyn Stewart Lansdown Beale, Stanwell Moor, near Staines, England, assignor to International Standard Electric Corporation, New York, N. Y., a corporation of Delaware Application February 8, 1952, Serial No. 270,707

Claims priority, application Great Britain February 28, 1951

1 Claim. (Cl. 250—27)

This invention relates to integrating networks with special reference to their use in engine indicators.

The invention comprises a process of integration for complex waves which comprises attenuating high frequency components thereof by predetermined amounts, linearly amplifying the resulting wave, and integrating the amplified wave in a manner whereby the attenuated high frequency components are restored in due proportion to their original attenuation.

The invention also comprises a signal responsive and integrating device which comprises means for attenuating selectively high frequency components of an applied signal, a linear amplifier for amplifying the resulting product, and integrating means to which the amplified output is applied, wherein the attenuated high frequency components are effectively restored to the said output in due proportion to the attenuation initially suffered, whereby a substantially true integration of the initially applied signal is obtained.

The invention also provides an engine indicator of the electro-mechanical type which comprises such a signal responsive and integrating device.

The invention will now be particularly described with reference to the accompanying drawing illustrating its use in a preferred embodiment.

In the drawing,

Fig. 1 shows a conventional elementary integrating network having two input terminals and two output terminals;

Fig. 2 shows in essentials a 4-terminal integrating network according to the invention, comprising an H. F. attenuator, an amplifier, and an integrating network with H. F. restorer; and Figs. 3 to 8 are explanatory diagrams relating to Fig. 2.

Engine indicators of the electro-mechanical type employ an electro-mechanical transducer to convert the pressure changes at the particular point in an engine it is required to indicate into electrical phenomena which may be displayed on a cathode ray oscilloscope against a suitable time-base derived from the engine crank-shaft.

The type of display produced depends on the type of transducer—or "pick-up," as it will hereafter be termed—used, and the subsequent treatment accorded to the electrical waves or impulses derived in the pick-up. Electromagnetic, or moving-iron, pick-ups, in which the output produced depends on the rate of variation of a magnetic field threading a coil of wire by means of a flexible iron diaphragm causing the reluctance of the magnetic path to vary, automatically give an output wave or impulse which is the first differential of the mechanical impulse giving rise to it, but for satisfactory engine indicating, it is preferred to examine the original impulse rather than its differential, and hence an integrating process must be applied to the output waves before exhibiting them on the screen of the oscilloscope.

Moreover, the power output available from such pickups is very small (although individual "spikes" in a peaky waveform may attain a large voltage excursion) and the integrating process itself, if it is to be satisfactory, i. e. give a faithful reproduction of the original wave, inevitably causes a further large attenuation in the output wave (theoretically, for the integration to be perfect, with an elementary integrator, as shown in Fig. 1, the attenuation must be infinite).

Amplification of the signal at some stage is therefore essential, and, from considerations of basic noise level, must be carried out before integration is effected. The output from the pick-up, however, is by no means sinusoidal and this leads to further difficulties in the amplification process, and it is necessary to limit the amplitude of the wave which has to be handled by the amplifier. This is because amplifiers are never perfectly linear, and even a minute degree of curvature of the characteristic would have the effect of amplifying the positive half-cycles by a different amount from the negative half-cycles, with the result that when these are integrated the mean value is not correct.

This effect shows itself very clearly when indicating a square-topped pulse such as is given by a valve moving rapidly from rest on a bottom stop to a top stop and returning again after an interval to the bottom stop. The output from the electro-magnetic pick-up in this case consists of a positive spike as the valve rises, and a negative spike when the valve falls. These two spikes have exactly the same area, but if passed through a non-linear amplifier, which for example amplifies the positive spike less than the negative spike, the integrated diagram will show the valve falling further than it rises, so that on its return it overshoots the base line, i. e. apparently falls below the bottom stop, which is clearly impossible.

Calculation shows that an extremely small degree of curvature in the amplifier characteristic is enough to cause a noticeable effect of this kind. Furthermore, if the input wave is very spiky, the first stage of the amplifier may actually be overloaded even when the integrated diagram is quite small, and this causes gross distortions of the type described.

Matters can be improved by using a balanced input (push-pull) amplifier, but even then this type of distortion can still be troublesome.

It is only the high frequency components in the original wave which cause the large amplitude in the direct diagram, and if these higher frequencies can be reduced by a controlled amount, or in controlled amounts, and subsequently, i. e. after amplification, be restored again in due proportion to their initial reduction, then the amplification problem becomes less acute, and the input "spike" (now broadened, and reduced in excursion) can be satisfactorily integrated into a "step" well above basic noise level for representation on the screen of the oscilloscope.

Referring now more particularly to the drawing, the elementary integrator referred to is illustrated in Fig. 1 and is of the well-known form comprising a series resistor $R_1$ and a shunt capacitor $C_1$, the input to be integrated being applied at terminals 1 and 2, and the integrated product being taken from terminals 3 and 4. The manner in which such a network performs an integration may be briefly indicated as follows.

The time-integral of a sinusoid $\overline{E}=E \cos \omega t$ is well-known to be $$\frac{E}{\omega} \sin \omega t$$

or generally, $$\frac{\overline{E}}{j\omega}$$

where $j$ is the complex radical of vector algebra, $\sqrt{-1}$), and hence, the integration of any complex input voltage consists merely in dividing each of its Fourier components by an integrating factor $j\omega$, $\omega$ being, of course, the angular frequency of the particular component.

From complex impedance considerations in Fig. 1 the ratio of output ($Vo$) to input ($Vi$) voltages is given by the ratio of output to input impedances, i. e.

$$\frac{Vo}{Vi} = \frac{1/j\omega C_1}{R_1 + 1/j\omega C_1}$$

which reduces to $$\frac{1}{j\omega C_1 R_1 + 1}$$

and this may be further rearranged as $$\frac{Vo}{Vi} = \frac{1}{C_1 R_1} \cdot \frac{1}{j\omega + 1/C_1 R_1} \qquad (1)$$

The factor $C_1 R_1$ is the time constant for the network, and if this be made long in comparison with the duration of the phenomenon under examination, then the fraction $1/C_1 R_1$ in the denominator of (1) becomes negligible, and the whole expression (1) becomes:

$$\frac{Vo}{Vi} \doteq \frac{1}{C_1 R_1} \cdot \frac{1}{j\omega} \qquad (2)$$

This indicates that the input is correctly integrated, and also attenuated by a loss factor $$\frac{1}{C_1 R_1}$$

which is large—in terms of attenuation—by hypothesis. This high degree of attenuation on integration has been referred to previously.

The necessary amplification can be satisfactorily provided, as previously suggested, by first attenuating the higher harmonics and then restoring them to their original amplitude in the integrating stage, after amplification.

A schematic circuit for effecting this is shown in Fig. 2. The voltage $Ei$ to be integrated is applied to the terminals 1, 2, whence it passes through the H. F. attenuator composed of series resistor $Ra$ and shunt capacitor $Ca$—having therefore the same configuration as an integrator—to the linear amplifier, the input voltage thereto being $Ea$. The amplifier output passes into the integrator proper comprising resistor $R_1$ and capacitor $C_1$ (by analogy with Fig. 1), but now $R_1$ is split into two parts, $Rr$ and $R_1-Rr$, the small portion $Rr$ being transferred into the output circuit in series with $C_1$. This is the "H. F. restorer," which introduces a "frequency-conscious" correction component into the performance. The output at terminals 3, 4, is $Eb$.

Analysing the circuit, the performance of the attenuator is given by the ratio:

$$\frac{Ea}{Ei} = \frac{1}{1 + j\omega CaRa} \qquad (3)$$

analogously with that given above for the integrator.

Ignoring the amplification, assumed constant for all frequencies within its range, the performance of the modified integrator is given by:

$$\frac{Eb}{Ea} = \frac{Rr + 1/j\omega C_1}{R_1 + 1/j\omega C_1} = \frac{1 + j\omega C_1 Rr}{1 + j\omega C_1 R_1} \qquad (4)$$

To obtain the effect of both acting together, the products (3) and (4) must be multiplied. Then:

$$\frac{Eb}{Ei} = \frac{1 + j\omega C_1 Rr}{1 + j\omega C_1 R_1} \cdot \frac{1}{1 + j\omega CaRa}$$

and if the time constants $C_1 Rr$ and $CaRa$ are made equal this reduces to:

$$\frac{Eb}{Ei} = \frac{1}{1 + j\omega C_1 R_1} = \frac{1}{C_1 R_1} \cdot \frac{1}{j\omega + 1/C_1 R_1}$$

which is identical with (1).

Thus the H. F. restorer has compensated for the H. F. attenuator, and since the result is correct in amplitude and phase and is independent of frequency, it obviously applies to transients as well as to steady state conditions.

Values used for the components in a typical case were as follows:

$Ra = 0.2$ M$\Omega$;
$Ca = 0.001 \mu$F;
$R_1 = 1$ M$\Omega$;
$Rr = 2000 \Omega$; (0.002 M$\Omega$);
$C_1 = 0.1 \mu$F.

Then $Ra \times Ca = 0.0002$ second $= Rr \times C_1$.

N. B.—The units of measurement must, of course, be in the same system of measurement throughout.

Figs. 3–8 illustrate diagrammatically the effect of passing a Heaviside unit pulse through the system.

In Fig. 3, the input voltage $Ei$ is shown as an infinite, infinitely narrow voltage impulse represented as P volt-seconds, repeated at some unspecified, finite time later in the negative direction, and Fig. 2 shows (solid) the accurate integration of these two impulses into the Heaviside step function having a height $P/C_1 R_1$. For a practical integrator ($C_1 R_1$ not infinitely great) a decay factor operates to distort the horizontal portion of the step, of a value given by $$\exp. -\frac{t}{C_1 R_1}$$

This distortion is illustrated by the dotted lines and may be corrected by use of the feed-back integrator described in prior specification No. 453,887.

The output of the H. F. attenuator for both pulses is illustrated in Fig. 5, where it will be seen that the pulse height has been reduced from infinity to $P/CaRa$ and spread out correspondingly in time.

Figs. 6 and 7 show the voltages existing across the integrating capacitor $C_1$ and across the restorer resistor $Rr$ respectively, with the H. F. attenuator in circuit. The voltage across the resistor has a decay factor $$\exp. -\frac{t}{CaRa}$$

while that across the capacitor has a decay factor the complement of this, viz $$\left(1 - \exp. -\frac{t}{CaRa}\right)$$

with the result, as shown in Fig. 8, than when the two act together, the effect of the H. F. attenuator is neutralised.

In the analysis, the amplifier has been assumed to have infinite input, and zero output, impedance, and therefore no reaction on the H. F. attenuator or integrator. This, of course, can only be approximated in practice, but by careful design of the component parts, the correction can be made, to all intents and purposes, complete.

While the principles of the invention have been described above in connection with specific embodiments, and particular modifications thereof, it is to be clearly understood that this description is made only by way of example and not as a limitation on the scope of the invention.

What we claim is:

A signal responsive and integrating device which comprises means for attenuating selectively high frequency components of an applied signal, a substantially linear amplifier for amplifying the resulting product, and integrating means to which the amplified output is applied, wherein the attenuated high frequency components are effectively restored to the said output in due proportion to the attenuation initially suffered, whereby a substantially true integration of the initially applied signal is obtained, said attenuating means and said integrating means each comprising a four-terminal network having series resistance in the leads from the input terminals and shunt capacitance across the output terminals, a small proportion of the series resistance of the said integrating means being removed from the series circuit thereof and connected in series with the capacitance in the shunt circuit thereof, the proportion being such that the product of the resistance so transferred and the capacitance in the shunt circuit of the integrating means is equal to the product of the resistance and capacitance elements of the said high frequency attenuator, similar units of measurement being used in the two cases.

References Cited in the file of this patent

UNITED STATES PATENTS

| | | |
|---|---|---|
| 2,268,813 | Foster | Jan. 6, 1942 |
| 2,470,099 | Hall | May 17, 1949 |